US012452368B2

(12) United States Patent
Corzo et al.

(10) Patent No.: US 12,452,368 B2
(45) Date of Patent: Oct. 21, 2025

(54) AI AUTOMATED FACILITATION OF SUPPORT AGENT/CLIENT INTERACTIONS IN MULTI-MODAL COMMUNICATIONS

(71) Applicant: Bank of America Corporation, Charlotte, NC (US)

(72) Inventors: Jennifer Corzo, Ewing, NJ (US); Jitender Singh, Robbinsville, NJ (US); Priyeshkumar Patel, Hillsborough, NJ (US); Bartholomew Sanjeevinathan, Chennai (IN); Amit Mishra, Chennai (IN); Pravin Kumar Sankari Bhagavathiappan, Kanyakumari District (IN); Nipun Mahajan, Lawrenceville, NJ (US)

(73) Assignee: Bank of America Corporation, Charlotte, NC (US)

( * ) Notice: Subject to any disclaimer, the term of this patent is extended or adjusted under 35 U.S.C. 154(b) by 204 days.

(21) Appl. No.: 18/389,325

(22) Filed: Nov. 14, 2023

(65) Prior Publication Data

US 2025/0159078 A1    May 15, 2025

(51) Int. Cl.
*H04M 3/493* (2006.01)
*G06F 21/32* (2013.01)
*G10L 15/18* (2013.01)
*G10L 15/26* (2006.01)
*H04M 3/51* (2006.01)

(52) U.S. Cl.
CPC ............ *H04M 3/493* (2013.01); *G06F 21/32* (2013.01); *G10L 15/1822* (2013.01); *G10L 15/26* (2013.01); *H04M 3/5183* (2013.01)

(58) Field of Classification Search
CPC .. G06F 3/011; G06F 3/04842; G06F 16/9035; G06F 21/32; G06F 40/279; G06N 3/0475; G06Q 10/06316; G10L 15/1822; G10L 15/26; H04L 9/3231; H04M 3/493; H04M 3/5166; H04M 3/5175;
(Continued)

(56) References Cited

U.S. PATENT DOCUMENTS 7,702,624 B2    4/2010  King et al.
8,194,646 B2    6/2012  Elliott et al.
(Continued)

FOREIGN PATENT DOCUMENTS

CN    1950763 B    12/2013
CN    109618068 B   4/2021
(Continued)

*Primary Examiner* — Gerald Gauthier
(74) *Attorney, Agent, or Firm* — Banner & Witcoff, Ltd.

(57) ABSTRACT

Systems and processes are disclosed to leverage conversational AI across voice and digital channels by automating employee interactions with clients to deliver humanized experiences with speed and accuracy. Live phone conversation. Transcriptions between clients and agents are generated. AI assist provides automation based on client interactions. Prompts are provided to speak to customers. Real time updates and summaries are sent to client devices and streamed to customize agent sessions. Auto navigation of agent views and manipulations of the agent screen are optimized by AI. Instant client validations are enabled via audible and visual confirmations on client devices. Various other AI implementations for improved processing our similarly disclosed.

20 Claims, 4 Drawing Sheets

(58) Field of Classification Search
CPC ............... H04M 3/5183; H04M 3/527; H04N 21/4223; H04W 4/60
See application file for complete search history.

(56) References Cited

U.S. PATENT DOCUMENTS

| | | | |
|---|---|---|---|
| 8,356,077 B2 | 1/2013 | Robinson et al. | |
| 8,676,707 B2 | 3/2014 | Flitcroft et al. | |
| 8,767,948 B1* | 7/2014 | Riahi | H04M 3/5175 379/266.01 |
| 9,122,744 B2 | 9/2015 | Spivack | |
| 9,521,524 B2 | 12/2016 | Busch | |
| 10,438,264 B1 | 10/2019 | Viswanathan | |
| 10,659,585 B1* | 5/2020 | Graham | H04M 3/493 |
| 10,693,872 B1* | 6/2020 | Larson | H04L 9/3231 |
| 10,897,538 B1* | 1/2021 | Paiva | H04M 3/5175 |
| 2007/0192252 A1 | 8/2007 | Shear et al. | |
| 2007/0226807 A1 | 9/2007 | Ginter et al. | |
| 2014/0342709 A1* | 11/2014 | Stepanian | H04N 21/4223 455/414.1 |
| 2018/0049043 A1 | 2/2018 | Hoffberg | |
| 2018/0234545 A1* | 8/2018 | Barak | H04M 3/527 |
| 2019/0035259 A1 | 1/2019 | Sloo et al. | |
| 2019/0042955 A1 | 2/2019 | Cahill et al. | |
| 2019/0064792 A1 | 2/2019 | Cella et al. | |
| 2019/0206402 A1* | 7/2019 | Shukla | G06F 3/011 |
| 2019/0221212 A1* | 7/2019 | Aggarwal | G06F 3/04842 |
| 2020/0076947 A1* | 3/2020 | Deole | H04M 3/527 |
| 2020/0244605 A1 | 7/2020 | Nagaraja et al. | |
| 2020/0293606 A1 | 9/2020 | Nelson et al. | |
| 2021/0357375 A1 | 11/2021 | Urdiales et al. | |
| 2022/0293096 A1* | 9/2022 | Mohapatra | G06F 40/279 |
| 2022/0294690 A1 | 9/2022 | Nolan et al. | |
| 2023/0154461 A1* | 5/2023 | Naughton | G06F 16/9035 704/270.1 |
| 2023/0199118 A1* | 6/2023 | Koneru | H04M 3/5166 379/88.01 |
| 2023/0396710 A1* | 12/2023 | Stepanian | H04W 4/60 |
| 2024/0160903 A1* | 5/2024 | Fouse | G06N 3/0475 |
| 2025/0117727 A1* | 4/2025 | Osborne | G06Q 10/06316 |
| 2025/0159078 A1* | 5/2025 | Corzo | H04M 3/493 |

FOREIGN PATENT DOCUMENTS

| | | |
|---|---|---|
| CN | 110610240 B | 3/2023 |
| CN | 107967575 B | 4/2023 |

* cited by examiner

AI AUTOMATED FACILITATION OF SUPPORT AGENT/CLIENT INTERACTIONS IN MULTI-MODAL COMMUNICATIONS

TECHNICAL FIELD

The present disclosure relates to electrical computers and digital processing systems and, more particularly, to machines and processes for dynamically leveraging artificial intelligence (AI) across multi-modal digital channels and by automating customer and agent interactions with AI assistance, analysis, monitoring, processing, prediction, and guidance to securely deliver humanized experiences with speed and accuracy.

DESCRIPTION OF THE RELATED ART

Traditional telephonic interactions between customer support agents and customers can be inefficient and are susceptible to errors/inaccuracies due to communication difficulties. There may also be security issues if voice or data in one mode of communication between the agent/customer is intercepted.

Traditional interactions also do not allow the customer to monitor the progress being made by the agent or the steps that are being performed by the agent. As such, the agents typically need to verbally identify and explain each step that is being performed. This can be confusing, time consuming, and frustrating.

Hence, there is a long felt and unsatisfied need to, inter alia, to improve efficiency, reduce time taken to complete processes, and reduce mistakes in order to facilitate client-agent interactions in a more timely manner, by creating and completing tasks more quickly with minimal mistakes, and to automate research and completion of tasks as well as obviate the need to verbally convey individual steps that are being performed by the agent in order to expedite the process. Real-time listening, analysis, prediction, etc. customer support activities are desired along with real-time client validation and responses in multi-modal communication systems.

SUMMARY OF THE INVENTION

In accordance with one or more arrangements of the non-limiting sample disclosures contained herein, solutions are provided to address one or more of the shortcomings by leveraging conversational AI across voice and digital channels by automating employee interactions with clients to deliver humanized experiences with speed and accuracy. Live phone conversations can be transcribed and recorded between the client and agent. AI automated assistance can be provided to the customer support agent based on client interactions. Prompts to speak to the customer can be displayed or can be selected on demand from options provided to the agent. Real-time updates/summaries can be sent to the client device. Auto navigation may be provided for agent view updates appropriate to the application or task at hand as support sessions progress. The client device in a second mode of communication can receive real-time activity updates and can provide instant client validation.

Summarization of conversations and caller intents based on what was said using IVR prior to being connected to agent can be provided. Real-time listening can be implemented using speech-to-text recognition and voice processing. Real-time activity updates on client devices can display all activities for the interaction throughout the call. Real-time validation can be used to enable clients to be able to both visually and audibly validate information if needed.

When a client is connected to a contact center voice agent, the agent will be able to service the customer. The system can use conversational AI to assist the agent during the call, allowing for conversation transcription, auto-navigation, and real-time updates directly on the client's device. The client can have the ability to approve/disapprove notifications sent to their device, allowing for instant and more accurate validations. Not only is this more efficient for wait times, but this can also help with security. With this system the client can see and approve what is happening at that very moment on the phone, limiting mistakes.

The system has the ability to share interactions between the client's phone and the agent's screen. By using a conversational AI bot, the associate can get the help needed allowing for little to no mistakes. This process can create efficient work as well as fast response times.

The agent can also have the system open on their device to ensure that the information being sent to the customer is correct. Backed by the system's AI, the number of mistakes will decrease while efficiency will increase, leading to a better overall customer experience.

The communication/interaction between the client and associate can be guided by AI on both the agent's and client's devices. For example, the client can have the ability to approve/disapprove any request that are taking place during their call with the associate, while the associate, with the help of AI, can send appropriate information to the client in real-time. This key factor helps to improve long wait times and allows the client to clearly see and understand what is happening throughout the call, on their own device. The use of AI is also meaningful to this system as it would provide more accurate information and real-time recommendations, resulting in fewer mistakes.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Nor is it intended to imply or require that any such steps or elements, in this summary or elsewhere in this disclosure, be implemented or executed in any particular order. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a process for artificial intelligence (AI), automated, real-time, facilitation of support interactions between an agent and a client in multi-modal communications can comprise one or more steps such as, for example: initiating, over a voice channel in response to a request from the client, voice communications via an interactive voice response (IVR) system in which the client provides user identification and identifies an issue with which assistance is required; capturing, by an AI assistant, the voice communications; extracting, by the AI assistant from the voice communications, a digital voice sample of the client for initial authentication; transmitting, from the AI assistant to a server, the digital voice sample; retrieving, by the server from secure storage, an authentic customer voice deposit; authenticating, by the AI assistant, the client by a comparison of the authentic customer voice deposit to the digital voice sample; generating, by the AI assistant, a transcription of the voice communications on speech-to-text processing; determining, by the AI assistant from an initial context of the voice communications, the issue; retrieving, by the server from secure storage, account information and user details for the client; generating, by a server and the AI assistant based on the initial context, the transcription, the issue, the account information, and the user details, a custom agent desktop graphical user interface (GUI) session for the agent to assist the client with the issue; initiating, by the server on a client device over a digital-data channel, digital communications in an app with the client; generating, by the AI assistant based on statements made by the agent on the voice channel, text representations of at least some of the statements in the digital communications; auto-populating, by the AI assistant, the issue in the app for verification; enabling, by the server and AI assistant, the client to verify the issue in the app via the digital channel; auto-populating, by the AI assistant, the account information in the app for verification; enabling by the server and the AI assistant, the client to verify the account information in the app via the digital channel; auto-populating, by the AI assistant, the user details in the app for verification; enabling by the server and the AI assistant, the client to verify user details via the digital channel; synchronizing, by the AI assistant, the voice communications and the digital communications; generating, by the AI assistant in real-time, an on-going session summary for actions taken during the support interactions; displaying, by the AI assistant in real-time on the client device, the on-going session summary so the client can follow along with the support interactions; providing, by the AI assistant in the custom agent desktop, a script for addressing the issue; analyzing, by the AI assistant, the voice communications and the digital communications in order to generate an on-going context for the support interaction; predicting, by the AI assistant based on the voice communications, the digital communications, and the on-going context, an ultimate problem to be solved and predictive suggestions to provide to the agent to make progress towards solving the ultimate problem; providing, by the AI assistant the predictive suggestions for the agent to consider as part of the support interaction; implementing, by the AI assistant, the predictive suggestions automatically if approved by the agent; continuously updating, based on monitored feedback from the voice communications, the digital communications, and the on-going context by the AI assistant, the predictive suggestions on an on-going basis to updated predicted suggestions and implementing the updated predictive suggestions when approved by the agent until the support interaction is successfully concluded; and learning, by the AI assistant from the voice communications, the digital communications, the on-going context, the predictive suggestions that were implemented and the updated predictive suggestions that were implemented in order to optimize the AI assistant to provide an optimum solution if presented with the issue in the future.

In some arrangements, one or more additional or alternative steps may be performed such as, for example, generating, by the AI assistant, a transcription summary of the transcription; displaying, by the AI assistant on the custom agent desktop GUI session the transcription summary to help the agent assist the client with the issue; creating the custom agent desktop GUI session only with information suggested by the AI assistant to put customer data for the client into focus; transforming, by the AI assistant, what the agent is seeing into what the agent needs to type in order to get assent from the client; transforming, by the AI assistant, customer data over which a mouse cursor for the custom agent desktop GUI session is placed into what the agent needs to type in order to get assent from the client; creating, by the AI assistant, a client session on the client device by copying over entitlements from the IVR system; orchestrating, by the AI assistant, the custom agent desktop GUI session and the client session based on a session ID and a device ID for the client device; recording, by the AI assistant, a screen capture of a customer view component on the client device along with a digital timestamp for customer consent recording keeping; automatically designating, by the AI assistant as completed, a checklist component for the customer consent to confirm client assent when detected via the voice channel; automatically designating, by the AI assistant as completed, a checklist component for the customer consent to confirm client assent when detected via the digital-data channel; enabling the client to provide both visual validation and audible validation; performing, by the AI assistant, real-time listening of the voice communications; providing, by the AI assistant, real-time activity updates on the client device to display all activities happening throughout support interaction; authenticating, by the agent as a subsequent account validation, the client based on the account information over the voice channel.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like (referenced interchangeably herein depending on context) can include one or more general-purpose, customized, configured, special-purpose, virtual, physical, and/or network-accessible devices as well as all hardware/software/components contained therein or used therewith as would be understood by a skilled artisan, and may have one or more application specific integrated circuits (ASICs), microprocessors, cores, executors etc. for executing, accessing, controlling, implementing etc. various software, computer-executable instructions, data, modules, processes, routines, or the like as explained below. References herein are not considered limiting or exclusive to any type(s) of electrical device(s), or component(s), or the like, and are to be interpreted broadly as understood by persons of skill in the art. Various specific or general components, machines, or the like are not depicted in the interest of brevity or discussed herein in detail because they would be known and understood by ordinary artisans.

Software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data/blockchains/distributed ledger blockchains etc.

Figure 1:
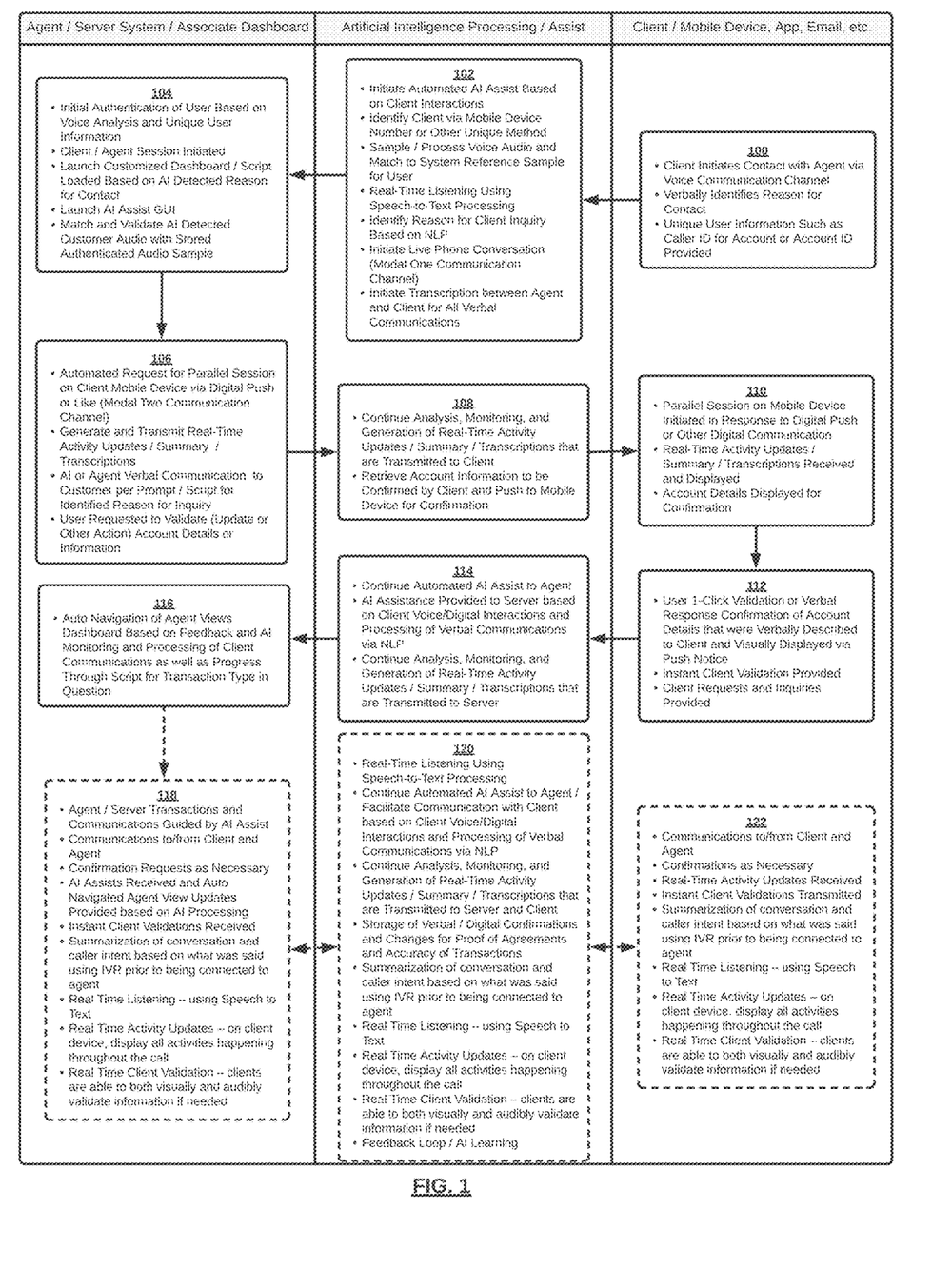
FIG. 1 depicts a sample, functional, swim-lane diagram with flow functionality conceptually showing sample interactions, steps, functions, and components in accordance with one or more aspects of this disclosure.

FIG. 1 depicts a sample, functional, swim-lane diagram with flow functionality conceptually showing sample interactions, steps, functions, and components in accordance with one or more aspects of this disclosure as distributed across: (a) an agent/server system/associate dashboard or the like; (b) artificial intelligence (AI) assistance, processing, automation, etc.; and (c) client activities and a client mobile device, app, email, or the like.

Starting with the client and the client's device in 100, a client initiates contact with a company or support agent via a voice, communication channel or phone call. The customer can verbally identify to a bot or to a live support agent the reason for the customer contact. Unique user information such as caller ID for the account or an account ID can be provided by the customer in order to validate the initial inquiry.

In 102, automated artificial intelligence process assistance may be initiated the client can be identified via the mobile or other unique method for initial verification of an account or a customer. The client's voice may be compared to voice, audio samples, stored in a data repository in order to digitally match the client contact to the client's previously stored voice sample. Real-time listening can be implemented so the artificial intelligence process can process the spoken speech by the customer and the agent and transcribe it into text for natural language processing (NLP). The reason for the client inquiry can be identified based on NLP and what the client said. A phone conversation can then be initiated with the agent via a voice channel or the like mode of communication. Transcription services between the client and agent can be deployed for all verbal communications via that channel mode.

In 104, the agent or server can perform an initial authentication of the user based on the voice analysis and/or unique user information. A client agent session can be initiated. And associate or application view can be launched and custom with a script loaded based on an artificial detected reason for the contact by the client. An AI assist graphical user interface can be launched and displayed as part of the associate dashboard. The customer's voice can be matched and validated with stored authenticated audio sample via artificial intelligence.

In 106, an automated request for parallel session on client mobile device via digital push or like (modal two communication channel) is initiated. Real-time activity updates/summary/transcriptions can be generated and transmitted. AI or agent verbal communication can be provided to customer per a prompt/script displayed on the dashboard that corresponds to the steps necessary to resolve the reason for the inquiry. The agent or AI assist can prompt the user to validate (update or other action) account details or information that can be displayed via the second channel automatically on the customer device.

In 108, artificial intelligence processing and assistance can continue to analyze, monitor, and generate real-time, activity, updates, summaries, and transcriptions that are transmitted to the client or used by the agent or server system. Account information can be retrieved for confirmation by the client and pushed to the mobile device for the customer for confirmation.

In 110, a parallel session on the user's mobile device can be opened or initiated in response to a digital push or other digital communication. Real-time activity, updates, summaries, transcriptions can be received by the mobile device and displayed. Account details can be displayed on the mobile device for confirmation by the user as well.

In 112, the user can validate the one click, or one press or activation of a user selectable icon on the mobile device or provide a verbal response confirmation of account details that were verbally described to the client and visually displayed via the push notice to the digital device. Instant client validation can be provided via this mechanism. Client requests and inquiries can be provided as well.

In 114, continued, automated AI assist to agent can be processed. AI assistance is provided to the server based on client voice and digital interactions and processing verbal communications via natural language processing (NLP).

Analysis, monitoring, and generation of real-time, activity, updates, summaries, and transcriptions that are transmitted to the server continues.

In 116, on the server, auto navigation of agent views in the dashboard based on feedback and AI monitoring and processing of client communications as well as progress through predefined scripts for transaction types at issue is provided. As an example, a predefined script could be set up to walk the agent through how to resolve an issue such as, the steps necessary to cancel a card and issue a replacement card if the user's card was lost or stolen.

Processes 118, 120, and 122 illustrate ongoing functionality, modules, tasks, and components that may be performed throughout the entirety of the session as needed.

On the server side, agent and server transactions and communications can be guided by AI assist. Communications to and from the client and the agent can be processed and logged. Confirmation request can be sent to the client as needed and responses there too can be captured and digitally preserved for future reference, and for updated records. AI assist can be received an auto navigated agent view updates can be provided based on AI processing. Client validations can be received. Summarization of conversations and intent based on what was said, using IVR (interactive voice response) prior to being connected to the agent can be provided to the agent automatically as well. Real-time, listening, using speech to text functionality, is implemented. Real-time activity updates are generated, used in the agent view, and provided to the client device in order to enable the client to follow along with the progress of the issue resolution. This can display all activities happening throughout the call. Real-time client validation is provided and clients are able to both visually and audibly validate information if needed or requested.

For AI assistance, artificial intelligence is used to perform real-time, listening, using speech to text processing. Automated AI assistance to the agent and facilitation of communication with client based on client, voice/digital interactions and processing verbal communications via natural language processing continues. Similarly, analysis, monitoring, and generation of real-time activity, updates, summaries, transcriptions that are transmitted to the server and the client as well. Storage of verbal/digital confirmations and changes for proof of agreements and accuracy of transactions is handled by AI if desired. Further, summarization, real-time, listening, real-time, activity updates, and real-time client validation can be facilitated via AI processing independently or in conjunction with similar functionality implemented on the server.

On the client device, communications to, and or from the client and the agent can be captured and displayed. Confirmations can be provided as necessary. Real-time activity updates can be received. Instant client validations can be transmitted from the client device to the server. Again, summarization, real-time, listening, real-time, activity updates, and real-time client validation can be facilitated via AI processing independently or in conjunction with similar functionality implemented on the server.

Figure 2:
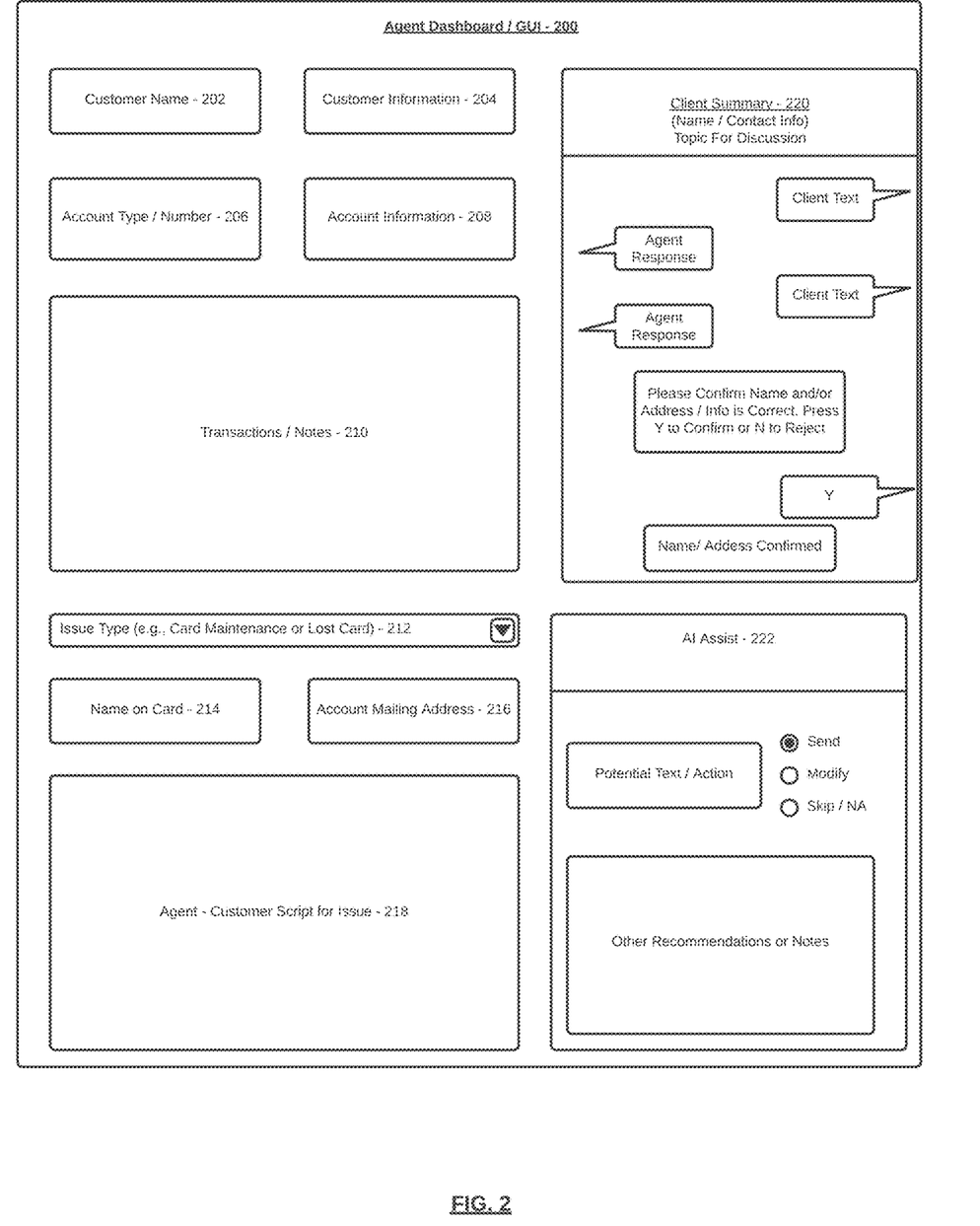
FIG. 2 depicts a sample, functional, graphical user interface with flow functionality conceptually showing sample interactions, steps, functions, and components in accordance with one or more aspects of this disclosure for an agent dashboard.

FIG. 2 depicts a sample, functional, graphical user interface with flow functionality conceptually showing sample interactions, steps, functions, and components in accordance with one or more aspects of this disclosure for an agent dashboard.

An agent dashboard may be provided that includes a graphical user interface 200. Various user and account information may be displayed including customer name 202, customer information 204, account type/number 206, and account information 208. Transactions on the account or notes regarding the account may be shown in a window, such as 210 as well.

GUI 200 may have a drop-down box 212 that allows the agent to select the reason for the customer call such as whether the user, lost a card or if card maintenance is required. Additional user and account information may be shown, such as the name on the card 214 and an account mailing address 216.

A static or interactive script for the agent to assist the customer with the particular issue may be displayed in 218 and controlled by artificial intelligence based on analysis of the conversation as desired.

A client summary window like 220 may provide the name and contact information for the customer who has initiated an inquiry along with the topic for discussion and an upper portion of a window. Client, messages and agent or responses can be displayed below for tracking of the discussion prompts may also be provided to enable the user to update or confirm account information or like.

An AI assist window 222 may suggest potential actions or text messages to be read, or sent digitally to the users mobile device. The agent may manually, choose to send them, modify them, skip them, or like as appropriate. The AI assist may also provide other recommendations or notes based on the issue at hand, and the status of the conversation being conducted.

Figure 3:
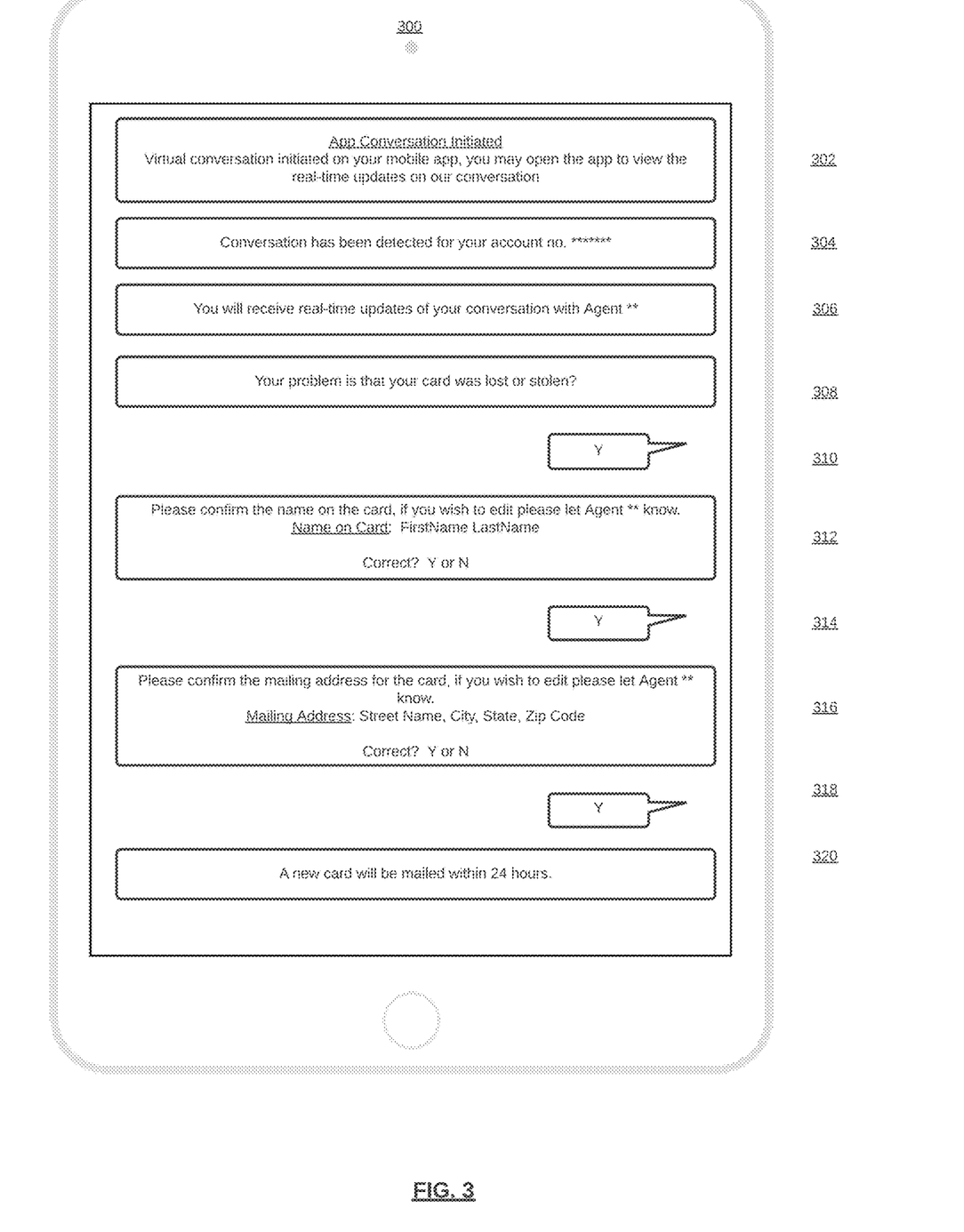
FIG. 3 depicts a sample, functional, graphical user interface with flow functionality conceptually showing sample interactions, steps, functions, and components in accordance with one or more aspects of this disclosure for a client device.

FIG. 3 depicts a sample, functional, graphical user interface with flow functionality conceptually showing sample interactions, steps, functions, and components in accordance with one or more aspects of this disclosure for a client device.

A user's mobile device 300 may be a smart phone, table, computer, or the like. In 302.com, an application conversation can be initiated and a confirmation message regarding the same can be displayed. This can be triggered automatically by the artificial intelligence or the server, or in response to local client processing. The message could say for example that a virtual conversation has been initiated on your mobile app, you may open the app to view the real-time updates on our conversation.

The conversation could continue in the separate mobile app or in the interactive text messages as desired. In 304 iMessage can be displayed saying that the conversation has been detected for your account and provide the account number or a portion thereof. In 306, the user can be told that they will receive real-time updates of their conversation, and also may identify the person with whom the customer is speaking the customer may be asked in 308 what the issue based on verbal or other information provided by the customer. Other prompts, messages, and confirmations may be provided such as the examples illustrated in 310, 312, 314, 316, 318, and 320.

Referring collectively to FIGS. 2 and 3 for example purposes, the present disclosure, in various aspects, provides, inter alia, automatic software/decision tree/menu/GUI navigation, automatic recommendations for the service agent, and facilitates communication from the agent's system to the client system. In general FIG. 2 might be displayed to the agent and FIG. 3 is what the customer might be see. The customer may also see portions of or a reproduction of window 220.

As an example of one portion of the inventive process, the agent might tell the customer that virtual conversation is going to be opened on the customer's mobile device, in parallel with the current conversation, so that the customer can follow along with everything that is happening from the agent's end. This provides for a multi-modal communication process. One aspect is the human-to-human discussion whether by phone, packetized voice transmission, VoIP, etc. The other aspect is the system-to-system digital communication transmission by and between the agent's system and the customer's mobile device, computer, tablet, chat, etc.

As an example of the type of multi-modal interaction and AI facilitation, a customer's personal information might need to be updated. The agent could ask the customer to confirm their address. The textual representation of the address can be sent by the agent's system automatically to the customer mobile device and displayed thereon for the customer to visually see and be able to confirm audibly or by pressing a button or otherwise responding on the device. The AI facilitation could be triggered by AI monitoring of what the agent is saying to the customer, automatically as part of the update process as the agent is proceeding to read aloud a customer service script, or be an AI prompt initially displayed to the agent that the agent could then confirm that the multi-modal text should then be sent to the customer.

In this example of updating personal information, the agent could ask the customer to confirm their address and AI can then send that text to the customer's mobile device. This ensures that they are both hearing and visually seeing the same thing and the same changes in order to avoid the possibility of any errors. It also expedites the process an obviates the needs for either party to repeat themselves.

As a sample demo, the following exchange might occur:

System/Agent/Bot: Hello [Customer Name], how may I help you today?

Customer: I lost my credit card today, so I need a new one.

Prompt on user device: A virtual conversation has been initiated on your mobile app. You may open the app to view real-time updates of our conversation.

System/Agent/Bot: Do not worry [Customer Name], I will help you with your credit card. Please give me a minute to start the process to request a new credit card.

The agent's view has assistive technology in the corner, which starts a new conversation on the customer's mobile device. The agent is doing the respective things needed to request the new credit card (i.e., Can you please confirm the name on the card?). The agent then asks the name on the card be confirmed. The customer receives a visual response showing the actual name.

Customer: Yes, this is fine.

System/Agent/Bot: Can you also confirm your mailing address?

Customer: Yes, it looks good.

System/Agent/Bot: You're all set. You will receive your card in 4 to 6 business days. Is there anything else I can help you with?

Customer: No thanks. That's all for today.

System/Agent/Bot: Okay. Have a great day. Okay.

In the queue panel, there is a real-time transcription which was transcribing the exchange between both parties, so that the agent and customer simultaneously were getting updates on their end.

AI can determine whether certain information should be shared with the client. For example, the name, this might be something that both parties should be seeing on their screen. So AI will prompt it automatically to be sent to the client.

AI is monitoring the conversation, and if it sees something that should be transferred, a pop up or prompt will generate, that the agent just clicks, and it is automatically sent or it can be provided to the agent as a suggestion to send. Preferably, the AI will simply decipher the conversation and send the information or prompt automatically.

The AI assist panel can the agent visual cues that the summary was sent, and what was sent, so the agent is not behind the conversation (i.e., it will say something like analyzing, recommending next action, etc.). At the end of the call, the agent assist can automatically send a summary. Notes may indicate that the conversation summary was sent.

Although the AI assist is providing assistance as needed to the agent as necessary, it is primarily operating autonomously as an intermediatory between the server/agent and the client.

In terms of suggesting potential messages or actions, they may be displayed in series or parallel and then the agent can select one or more verbally or by clicking user selectable objections. Preferably, it can operate automatically behind the scenes to avoid creating more work for the agent.

Essentially, the present disclosure uses speech to text to provide the transcriptions and then is communication between the client system and, in this case, with the client and agent, the device would be communicating and listening to the phone conversations of both agent and client.

Figure 4:
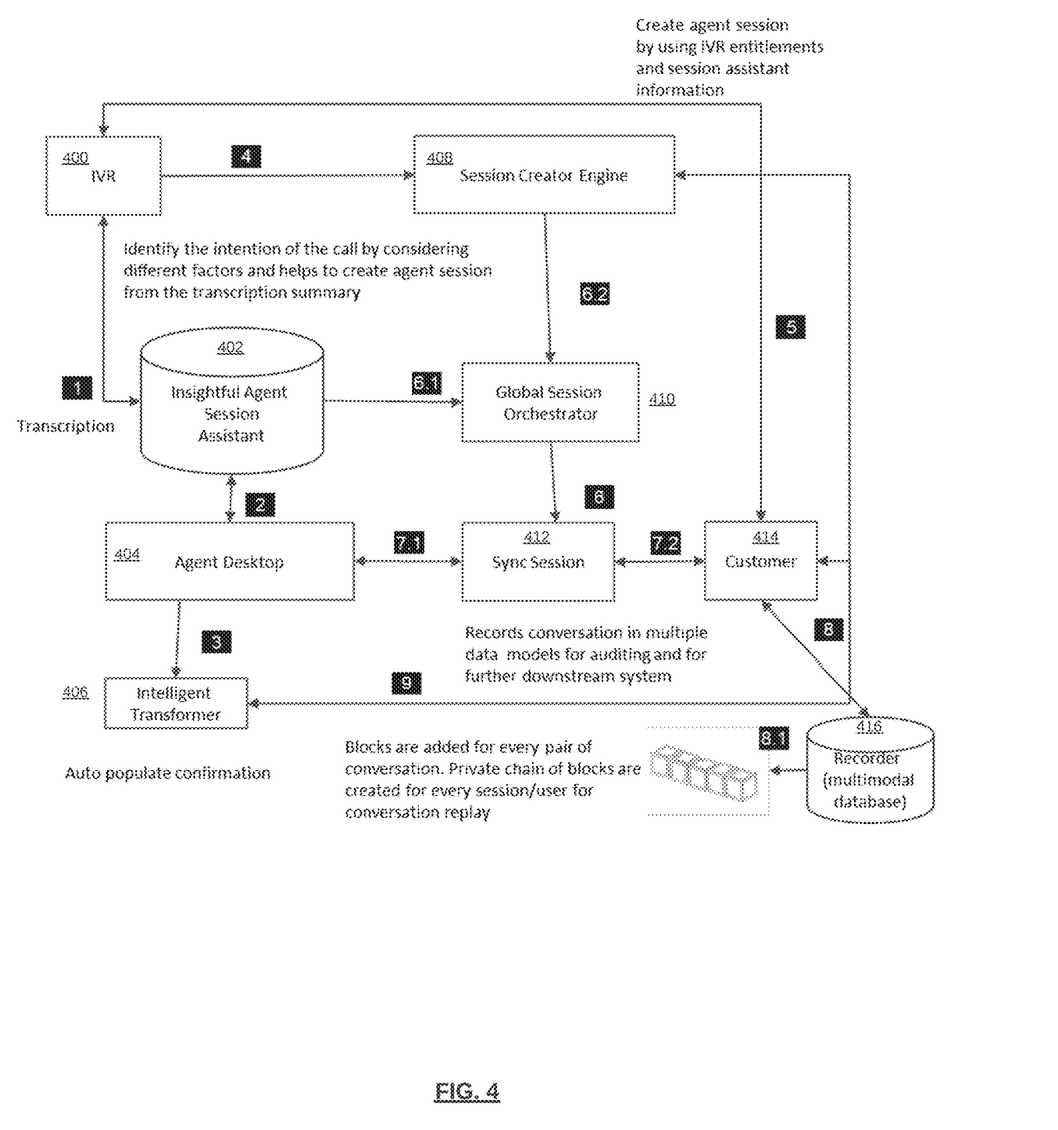
FIG. 4 depicts a sample, functional, technical/representative architectural diagram with flow functionality conceptually showing sample interactions, steps, functions, and components in accordance with one or more aspects of this disclosure.

FIG. 4 depicts a sample, functional, technical/representative architectural diagram with system flow functionality conceptually showing sample interactions, steps, functions, and components in accordance with one or more aspects of this disclosure.

As indicated previously, various aspects can be grouped into server/agent actions and functions, AI processing/assistance functions, and customer/user device functions that may include text messaging as well as a secure dedicated smartphone app.

FIG. 4 illustrates how these systems and functionality interact in real-time, how the sessions are created, and the multi-mode channels that are in use and in sync.

Individual components include: an interactive voice response system (IVR) 400, an insightful agent session assistant 402, an agent desktop 404 displayed to the agent via a server, an intelligent transformer 406, a session creator engine 408, a global session orchestrator 410, a sync session objection 412, a customer device 414, a recorder (e.g., multimodal database storage of data, conversations, voice samples, validated information, validated responses, etc.) 416 that are stored as a private chain of blocks.

At a high level, the various numbered interactions in FIG. 4 correspond to: (1) IVR passes transcription summary to agent desktop; (2) Agent Desktop session is created only with the content and system that transcription suggests and puts the calling customer data in focus; (3) Agent Desktop will also load Intelligent transformer that will transform what agent is seeing to what he needs to type in to get customer consent (for example—"Phone No: xxx-xxxx-xxxx on focus of mouse" will lead to customer seeing "can you confirm your phone number"; (4) Once Desktop is loaded-Session Creator Engine will copy over entitlement of IVR and create a new session in the mobile app or like; (5) Customer will have access to features in mobile app or like that will be contemporary to features in IVR; (6.1/6.2) Global Session Orchestrator will orchestrate the session between Agent desktop and customer mobile (Session id will have device ID of agent and customer); (7.1/7.2) Synced up session will be streamed real time to Agent desktop; (8/8.1) Multimodal recorder will record the picture of the screen shot of customer view component and timestamp along with timestamp of customer consent for audit purpose; and (9) the check box on the agent desktop (Did customer provide consent will be automatically checked on the agent has consented).

Thus, a customer can contact the company in question by use of an interactive voice response or the like in order to address an issue. As soon as a call is transferred from a queue to an agent, the summary and everything is passed on to that agent session assistant.

Other functionality is performed concurrently such as a session creator engine, which basically takes care of creating a similar session with the same session ID and the device ID and other details.

These sessions belong to the same customer, all the different channels, but they belong to the same customer and for the same intent.

The next component is an intelligent transformer. The role of this is basically to map whatever the agent does including mouse movements, selections, highlighting, text entries, etc. The goal of this is basically to load the corresponding actions that need to happen on the other channels (i.e., if a customer or the agent is trying to look at the phone number and he takes the host mouse or host the mouse on that phone number field on the agent desktop. The corresponding description that will be coming from the mobile app, or that would be 'Can you confirm your phone number?,' which would be the kind of the problem that needs to be presented to the customer, so that's how this transformer will load and map.

What the agent is trying to do on the desktop versus what/how it should be perceived on the mobile screen that the customer has.

Once the desktop is loaded, the other role of the session creator is to copy over all the entitlements. Whether it is the customer party ID, customer account number, or the unique characteristics or attributes of the customer. They need to copy it over to the record, the mobile app, so that we have a similar and created with the same activities.

The other piece is a global session orchestrator. The role of this orchestrator is to basically toggle between the customization in the desktop and the customization in the mobile app or the like. For example, if the customer is doing or selecting something for confirmation in the mobile app that information needs to be relayed back, or sending up with the session that is happening, or created on the agent desktop site.

This orchestrater will look at if the two parties which are doing different things in two different sections, how to bring all those together so that both the sessions are updated with the latest information that needs to be there. That is the role of an orchestrator and the same session blocked on the screen.

At the bottom, you will see the multi modal database. Normally, as a regulatory requirement, we need to capture the consent of the user, for example, if we are asking them if they are asking us to transfer money.

We need to ensure we have the consent to transfer funds from their account. On the agent side, normally, there's a recording platform, which is linked or connected, so anything that the agenda the customer says is recorded and save for 7 years. Because we are introducing a new channel to capture the consent, a customer may or may not choose to confirm or give consent in a voice form. The customer may only click on the screen and say yes, and this is correct like, some kind of button is on the screen. Therefore, the goal of this recorder set up is it will take the screenshot as soon as customer says yes and save it with the timestamp. We will have this blocked or 10 of blogs created for every session for user.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A process for artificial intelligence (AI), automated, real-time, facilitation of support interactions between an agent and a client in multi-modal communications comprising the steps of:

initiating, over a voice channel in response to a request from the client, voice communications via an interactive voice response (IVR) system in which the client provides user identification and identifies an issue with which assistance is required;

capturing, by an AI assistant, the voice communications;

extracting, by the AI assistant from the voice communications, a digital voice sample of the client for initial authentication;

transmitting, from the AI assistant to a server, the digital voice sample;

retrieving, by the server from secure storage, an authentic customer voice deposit;

authenticating, by the AI assistant, the client by a comparison of the authentic customer voice deposit to the digital voice sample;

generating, by the AI assistant, a transcription of the voice communications on speech-to-text processing;

determining, by the AI assistant from an initial context of the voice communications, the issue;

retrieving, by the server from secure storage, account information and user details for the client;

generating, by a server and the AI assistant based on the initial context, the transcription, the issue, the account information, and the user details, a custom agent desktop graphical user interface (GUI) session for the agent to assist the client with the issue;

initiating, by the server on a client device over a digital-data channel, digital communications in an app with the client;

generating, by the AI assistant based on statements made by the agent on the voice channel, text representations of at least some of the statements in the digital communications;

auto-populating, by the AI assistant, the issue in the app for verification;

enabling, by the server and AI assistant, the client to verify the issue in the app via the digital channel;

auto-populating, by the AI assistant, the account information in the app for verification;

enabling by the server and the AI assistant, the client to verify the account information in the app via the digital channel;

auto-populating, by the AI assistant, the user details in the app for verification;

enabling by the server and the AI assistant, the client to verify user details via the digital channel;

synchronizing, by the AI assistant, the voice communications and the digital communications;

generating, by the AI assistant in real-time, an on-going session summary for actions taken during the support interactions;

displaying, by the AI assistant in real-time on the client device, the on-going session summary so the client can follow along with the support interactions;

providing, by the AI assistant in the custom agent desktop, a script for addressing the issue;

analyzing, by the AI assistant, the voice communications and the digital communications in order to generate an on-going context for the support interaction;

predicting, by the AI assistant based on the voice communications, the digital communications, and the on-going context, an ultimate problem to be solved and predictive suggestions to provide to the agent to make progress towards solving the ultimate problem;

providing, by the AI assistant the predictive suggestions for the agent to consider as part of the support interaction;

implementing, by the AI assistant, the predictive suggestions automatically if approved by the agent;

continuously updating, based on monitored feedback from the voice communications, the digital communications, and the on-going context by the AI assistant, the predictive suggestions on an on-going basis to updated predicted suggestions and implementing the updated predictive suggestions when approved by the agent until the support interaction is successfully concluded; and learning, by the AI assistant from the voice communications, the digital communications, the on-going context, the predictive suggestions that were implemented and the updated predictive suggestions that were implemented in order to optimize the AI assistant to provide an optimum solution if presented in future.

2. The process of claim 1 wherein the voice channel and the digital-data channel are separate.

3. The process of claim 2 further comprising the steps of:
generating, by the AI assistant, a transcription summary of the transcription; and
displaying, by the AI assistant on the custom agent desktop GUI session the transcription summary to help the agent assist the client with the issue.

4. The process of claim 3 wherein custom agent desktop GUI session is created only with information suggested by the AI assistant to put customer data for the client into focus.

5. The process of claim 4 further comprising the step of: transforming, by the AI assistant, what the agent is seeing into what the agent needs to type in order to get assent from the client.

6. The process of claim 4 further comprising the step of: transforming, by the AI assistant, customer data over which a mouse cursor for the custom agent desktop GUI session is placed into what the agent needs to type in order to get assent from the client.

7. The process of claim 6 in which the customer data is a telephone number displayed on the custom agent desktop GUI session.

8. The process of claim 7 further comprising the step of: creating, by the AI assistant, a client session on the client device by copying over entitlements from the IVR system.

9. The process of claim 8 further comprising the step of: orchestrating, by the AI assistant, the custom agent desktop GUI session and the client session based on a session ID and a device ID for the client device.

10. The process of claim 9 wherein the custom agent desktop GUI session and the client session are synchronized.

11. The process of claim 10 further comprising the step of: recording, by the AI assistant, a screen capture of a customer view component on the client device along with a digital timestamp for customer consent recording keeping.

12. The process of claim 11 further comprising the step of: automatically designating, by the AI assistant as completed, a checklist component for the customer consent to confirm client assent when detected via the voice channel.

13. The process of claim 11 further comprising the step of: automatically designating, by the AI assistant as completed, a checklist component for the customer consent to confirm client assent when detected via the digital-data channel.

14. The process of claim 13 wherein the client is able to provide both visual validation and audible validation.

15. The process of claim 14 further comprising the step of: performing, by the AI assistant, real-time listening of the voice communications.

16. The process of claim 15 further comprising the step of: providing, by the AI assistant, real-time activity updates on the client device to display all activities happening throughout support interaction.

17. The process of claim 16 further comprising the step of: authenticating, by the agent as a subsequent account validation, the client based on the account information over the voice channel.

18. A process for artificial intelligence (AI), automated, real-time, facilitation of support interactions between an agent and a client in multi-modal communications comprising the steps of:

initiating, over a voice channel in response to a request from the client, voice communications via an interactive voice response (IVR) system in which the client provides user identification and identifies an issue with which assistance is required;

capturing, by an AI assistant, the voice communications;

generating, by the AI assistant, a transcription of the voice communications on speech-to-text processing;

determining, by the AI assistant from an initial context of the voice communications, the issue;

retrieving, by server from secure storage, account information and user details for the client;

generating, by a server and the AI assistant based on the initial context, the transcription, the issue, the account information, and the user details, a custom agent desktop graphical user interface (GUI) session for the agent to assist the client with the issue;

initiating, by the server on a client device over a digital-data channel, digital communications in an app with the client;

generating, by the AI assistant based on statements made by the agent on the voice channel, text representations of at least some of the statements in the digital communications;

auto-populating, by the AI assistant, the issue in the app for verification;

enabling, by the server and AI assistant, the client to verify the issue in the app via the digital channel;

auto-populating, by the AI assistant, the account information in the app for verification;

enabling by the server and the AI assistant, the client to verify the account information in the app via the digital channel;

auto-populating, by the AI assistant, the user details in the app for verification;

enabling by the server and the AI assistant, the client to verify user details via the digital channel;

synchronizing, by the AI assistant, the voice communications and the digital communications;

generating, by the AI assistant in real-time, an on-going session summary for actions taken during the support interactions;

displaying, by the AI assistant in real-time on the client device, the on-going session summary so the client can follow along with the support interactions;

providing, by the AI assistant in the custom agent desktop, a script for addressing the issue;

analyzing, by the AI assistant, the voice communications and the digital communications in order to generate an on-going context for the support interaction;

predicting, by the AI assistant based on the voice communications, the digital communications, and the on-going context, an ultimate problem to be solved and predictive suggestions to provide to the agent to make progress towards solving the ultimate problem;

providing, by the AI assistant the predictive suggestions for the agent to consider as part of the support interaction;

implementing, by the AI assistant, the predictive suggestions automatically if approved by the agent;

continuously updating, based on monitored feedback from the voice communications, the digital communications, and the on-going context by the AI assistant, the predictive suggestions on an on-going basis to updated predicted suggestions and implementing the updated predictive suggestions when approved by the agent until the support interaction is successfully concluded; and learning, by the AI assistant from the voice communications, the digital communications, the on-going context, the predictive suggestions that were implemented and the updated predictive suggestions that were implemented in order to optimize the AI assistant to provide an optimum solution if presented with the issue in future.

19. The process of claim 18 further comprising the steps of:

automatically designating, by the AI assistant as completed, a checklist component for customer consent to confirm client assent when detected via the voice channel;

automatically designating, by the AI assistant as completed, a checklist component for the customer consent to confirm client assent when detected via the digital-data channel;

performing, by the AI assistant, real-time listening of the voice communications; and providing, by the AI assistant, real-time activity updates on the client device to display all activities happening throughout support interaction.

20. A process for artificial intelligence (AI), automated, real-time, facilitation of support interactions between an agent and a client in multi-modal communications comprising the steps of:

initiating, over a voice channel in response to a request from the client, voice communications via an interactive voice response (IVR) system in which the client provides user identification and identifies an issue with which assistance is required;

capturing, by an AI assistant, the voice communications;

extracting, by the AI assistant from the voice communications, a digital voice sample of the client for initial authentication;

transmitting, from the AI assistant to a server, the digital voice sample;

retrieving, by the server from secure storage, an authentic customer voice deposit;

authenticating, by the AI assistant, the client by a comparison of the authentic customer voice deposit to the digital voice sample;

generating, by the AI assistant, a transcription of the voice communications on speech-to-text processing;

determining, by the AI assistant from an initial context of the voice communications, the issue;

retrieving, by the server from secure storage, account information and user details for the client;

generating, by a server and the AI assistant based on the initial context, the transcription, the issue, the account information, and the user details, a custom agent desktop graphical user interface (GUI) session for the agent to assist the client with the issue;

initiating, by the server on a client device over a digital-data channel, digital communications in an app with the client;

generating, by the AI assistant based on statements made by the agent on the voice channel, text representations of at least some of the statements in the digital communications;

auto-populating, by the AI assistant, the issue in the app for verification;

enabling, by the server and AI assistant, the client to verify the issue in the app via the digital channel;

auto-populating, by the AI assistant, the account information in the app for verification;

enabling by the server and the AI assistant, the client to verify the account information in the app via the digital channel;

auto-populating, by the AI assistant, the user details in the app for verification;

enabling by the server and the AI assistant, the client to verify user details via the digital channel;

synchronizing, by the AI assistant, the voice communications and the digital communications;

generating, by the AI assistant in real-time, an on-going session summary for actions taken during the support interactions;

displaying, by the AI assistant in real-time on the client device, the on-going session summary so the client can follow along with the support interactions;

providing, by the AI assistant in the custom agent desktop, a script for addressing the issue;

analyzing, by the AI assistant, the voice communications and the digital communications in order to generate an on-going context for the support interaction;

predicting, by the AI assistant based on the voice communications, the digital communications, and the on-going context, an ultimate problem to be solved and predictive suggestions to provide to the agent to make progress towards solving the ultimate problem;

providing, by the AI assistant the predictive suggestions for the agent to consider as part of the support interaction;

implementing, by the AI assistant, the predictive suggestions automatically if approved by the agent;

continuously updating, based on monitored feedback from the voice communications, the digital communications, and the on-going context by the AI assistant, the predictive suggestions on an on-going basis to updated predicted suggestions and implementing the updated predictive suggestions when approved by the agent until the support interaction is successfully concluded; and learning, by the AI assistant from the voice communications, the digital communications, the on-going context, the predictive suggestions that were implemented and the updated predictive suggestions that were implemented in order to optimize the AI assistant to provide an optimum solution if presented with the issue in future.

* * * * *